United States Patent [19]
Mullet et al.

[11] 4,046,200
[45] Sept. 6, 1977

[54] LAWN EDGER ATTACHMENT

[75] Inventors: David L. Mullet, Heeston; Raymond J. Rilling, Moundridge; Elmer D. Voth, Newton, all of Kans.

[73] Assignee: Excel Industries, Inc., Hesston, Kans.

[21] Appl. No.: 626,032

[22] Filed: Oct. 28, 1975

[51] Int. Cl.² .................. A01B 45/00; A01G 3/06
[52] U.S. Cl. ........................... 172/14; 56/256; 172/165; 172/184; 172/335; 172/457; 172/570; 172/668
[58] Field of Search .................. 172/13–17, 172/19, 165, 166, 184, 362, 457, 602, 570, 569, 668, 335; 56/233–235, 237, 251, 256, 17.1, 13.7

[56] References Cited

U.S. PATENT DOCUMENTS

| | | | |
|---|---|---|---|
| 984,103 | 2/1911 | Paul | 172/570 |
| 1,505,685 | 8/1924 | Allen | 172/14 |
| 2,752,841 | 7/1956 | La Plante | 172/14 |
| 3,019,844 | 2/1962 | Key | 172/15 |
| 3,731,750 | 5/1973 | Brazell | 172/457 |

FOREIGN PATENT DOCUMENTS

| | | | |
|---|---|---|---|
| 2,101,630 | 8/1972 | Germany | 56/256 |
| 1,033,828 | 6/1966 | United Kingdom | 56/17.1 |

*Primary Examiner*—Paul E. Shapiro
*Attorney, Agent, or Firm*—John A. Hamilton

[57] ABSTRACT

A lawn edger attachment for moving vehicles consisting of a rolling coulter blade carried for rotation on a horizontal axis at the rearward end of a trailing arm pivoted at its forward end to the vehicle on a generally vertical axis. Mechanism is provided for pivoting the arm vertically to raise or lower the blade, and also to cause the arm to trail normally at different lateral spacings from the vehicle, although said arm may also be pivoted laterally by manual force. A broom or scraper is also provided, in trailing relation to the blade, for sweeping the cuttings of the blade either to the pavement, or to the grass, adjacent the juncture line between the pavement and the grass.

9 Claims, 11 Drawing Figures

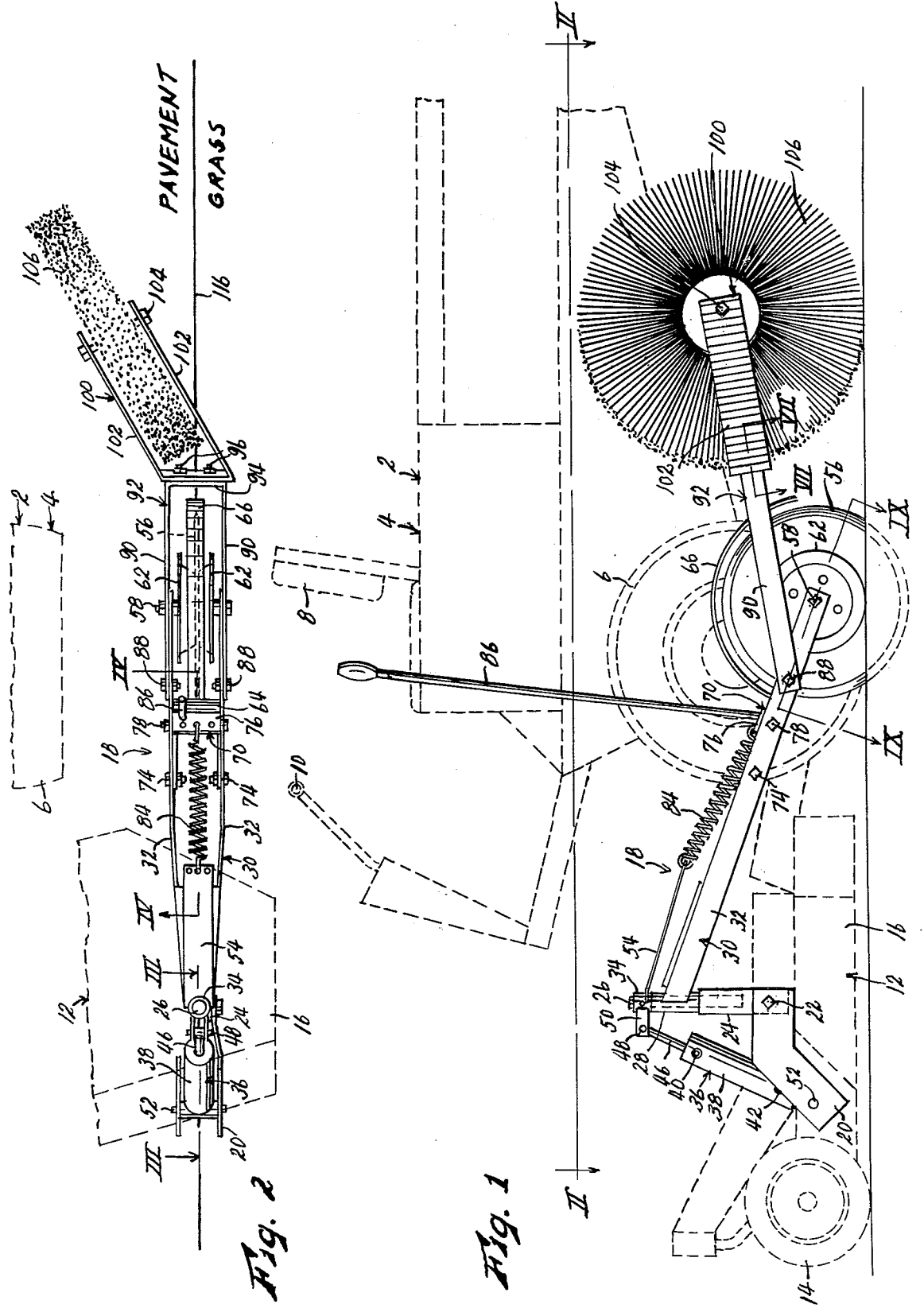

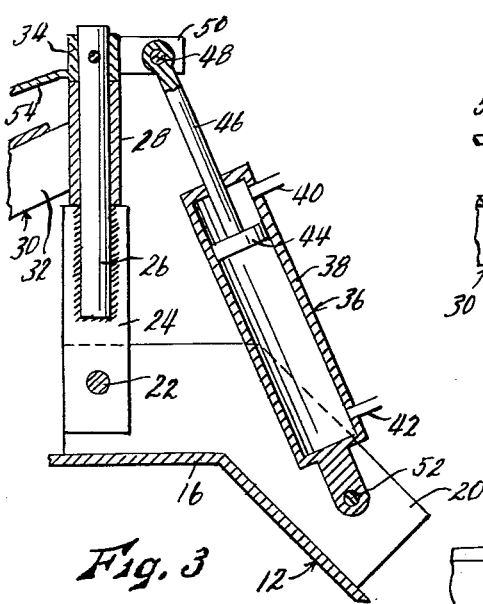
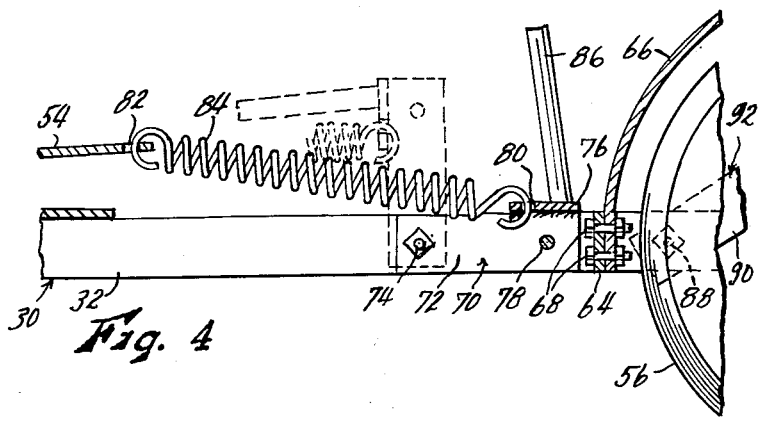
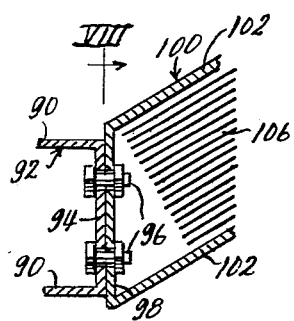
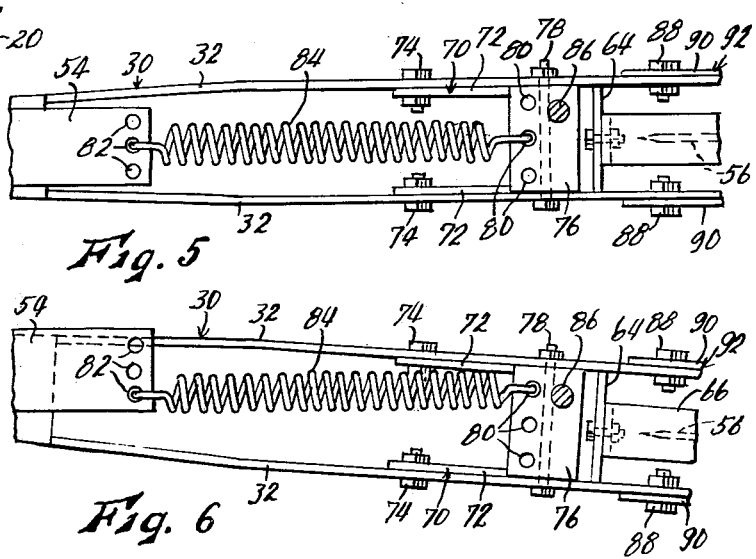
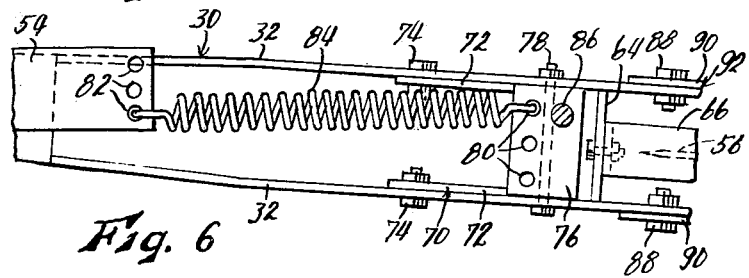
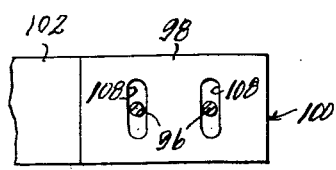
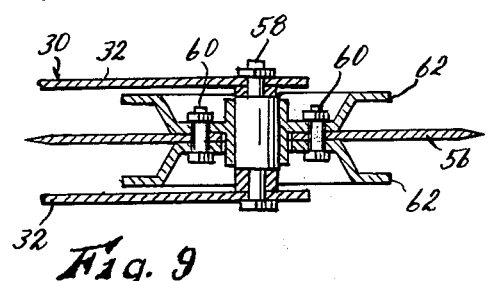
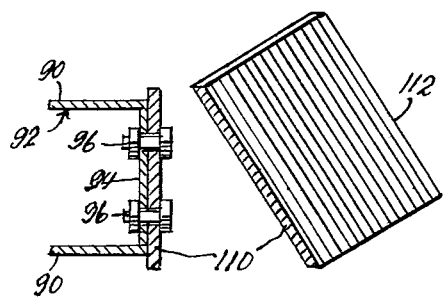
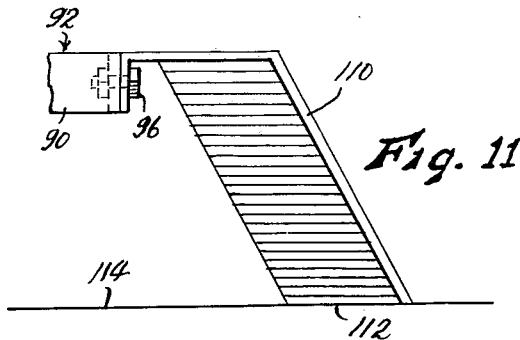

LAWN EDGER ATTACHMENT

This invention relates to new and useful improvements in lawn edgers, that is, devices for cutting the grass of lawns which tends to extend out over the surface of adjacent sidewalks, driveways and the like, and which cannot be cut by ordinary mowers. Various devices for this purpose have heretofore been proposed, but all within our knowledge have been subject to certain disadvantages. They have been generally complicated, cumbersome, and difficult to operate. If mounted on self-propelled vehicles, they have required very careful and precise steering of the vehicle to keep the edging blade positioned accurately at the edge of the concrete. If mounted on any type of manually propelled carrier, they have tended to require excessive manual force for operation. The general object of the present invention, accordingly, is the provision of a lawn edging device which overcomes all of the above enumerated disadvantages of prior devices.

More specifically, it is an object of the present invention to provide a lawn edging device consisting of a rolling coulter blade carried for rotation on a horizontal axis generaly transverse to the line of travel at the rearward end of a coulter arm, the coulter arm being pivoted at its forward end on a generally vertical axis to a self-propelled vehicle, whereby the blade trails the pivotal axis of the arm, and can move transversely to the line of travel. Manual means are provided for pivoting the arm, whereby the blade may be guided to follow the pavement edge accurately despite variations in the spacing of the vehicle from said edge.

Another object is the provision of a lawn edger of the character described wherein are provided means for pivoting the coulter arm vertically, whereby the blade may be elevated entirely above ground level for convenience of transport, and means resiliently resisting lateral pivoting of the coulter arm, so as to resist unrestrained swinging of said arm when it is in its transport position.

A further object is the provision of a lawn edger of the character described including means whereby the normal trailing angle of the coulter arm may be adjusted. If properly used as a guide for spacing the carrying vehicle from the pavement edge, this provides a degree of automatic "self-steering" of the blade, as well as "self-sharpening" thereof against the pavement.

Other objects are simplicity and economy of construction and efficiency and dependability of operation.

With these objects in view, as well as other objects which will appear in the course of the specification, reference will be had to the accompanying drawing, wherein:

FIG. 1 is a side elevational view of a lawn edging device embodying the present invention, shown operativey mounted as an attachment for a mowing machine, indicated in dotted lines, FIG. 2 is a fragmentary sectional view taken on line II—II of FIG. 1, FIG. 3 is an enlarged, fragmentary sectional view taken on line III—III of FIG. 2, FIG. 4 is an enlarged, fragmentary sectional view taken on line IV—IV of FIG. 2, showing the spring-release position of the spring lever in dotted lines, FIG. 5 is a top plan view of the parts shown in FIG. 4, FIG. 6 is a view similar to FIG. 5, showing the spring adjusted to change the trailing angle of the coulter arm, FIG. 7 is an enlarged, fragmentary sectional view taken on line VII—VII of FIG. 1, FIG. 8 is a fragmentary sectional view taken on line VIII—VIII of FIG. 7, FIG. 9 is an enlarged, fragmentary sectional view taken on line IX—IX of FIG. 1, FIG. 10 is a view similar to FIG. 7, but showing a scraper blade substituted for the sweeper broom, and FIG. 11 is a side elevational view of the parts shown in FIG. 10.

Like reference numerals apply to similar parts throughout the several views, and the numeral 2 applies generally to a mowing machine which has been selected as an example of a self-propelled vehicle on which a lawn edging device embodying the present invention may be mounted as an attachment. Said mowing machine includes a small self-propelled tractor 4 having powered ground-engaging wheels 6 (one shown), adapted to move forwardly to the left, as viewed in FIGS. 1 and 2. It may also have a rear castered wheel, not shown. It also includes a driver's seat 8 and control levers 10. Attached to the forward end of the tractor is a mowing head 12 which it will be understood includes mower blades powered by the tractor, and which is supported by castered ground-engaging wheels 14 (one shown). Said head includes a hood member 16 which projects laterally to the left of the tractor body. The present lawn-edger, indicated generally by the numeral 18, is mounted on this leftward projection of hood 16.

The edger device includes a bracket 20 rigidly affixed to the top surface of hood 16 by any suitable means, not shown. Pivoted to said bracket on a horizontal transverse axis, as by bolt 22, is a generally upright mounting plate 24 to which is welded an upright stub axle 26 which projects upwardly from said plate. Mounted rotatably on said stub axle is a sleeve 28 to which is rigidly affixed a downwardly and rearwardly inclined coulter arm 30, said arm consisting of a pair of laterally spaced apart side rails 32. A collar 34 is rigidly affixed on axle 26 above sleeve 28 to secure said sleeve on said axle. A hydraulic ram 36 includes a double-acting hydraulic cylinder 38 having hydraulic connections 40 and 42, and a piston 44 operable in said cylinder and having affixed thereto a piston rod 46 projecting axially from the cylinder. The extended end of said piston rod is pivoted, as at 48, between a pair of ears 50 affixed to collar 34. The ram is inclined downwardly and forwardly from pivot 48, and the lower end of cylinder 38 is pivoted, as at 52, to bracket 20. Thus, by selectively extending or retracting ram 36, axle 26 may be pivoted on bolt 22 to respectively lower or raise coulter arm 30 in a vertical direction. The hydraulic control system for ram 36 may be standard and is not shown, it being understood that this system is powered by a hydraulic pump mounted on and driven by tractor 4, and is operable to maintain a constant pressure in cylinder 38 when desired. Also affixed to collar 34 is a rigid spring connector arm 54 which is inclined downwardly and rearwardly in spaced apart relation above coulter arm 30, but which is much shorter than said coulter arm.

Carried between the rearward end portions of side rails 32 of coulter arm 30 is a coulter blade 56, consisting of a flat circular disc with its peripheral edge portion tapered to a sharp edge. Said coulter blade could also be of the concave-convex, or "dished" type, if desired. Said blade is carried rotataby by an axle bolt 58, and suitable bearings, said bolt extending laterally between and being secured in side rails 32. Affixed concentrically to each side of the blade, as by bolts 60 (see FIG. 9) is a guage wheel 62, said gauge wheels being of equal diameters less than the diameter of the blade. The peripheries of said gauge wheels are spaced outwardly from the blade disc, as shown. Just forwardly of blade 56, side rails 32 of arm 30 are rigidly connected by a cross-bar 64, and a blade protector 66 is affixed to said cross bar by bolts 68 (see FIG. 4) and curves upwardly and rearwardly around said blade to protect operators against injury by said blade.

Just forwardly of cross bar 64, a spring tightener lever 70 is mounted between said rails 32 of arm 30. Said lever consists of a pair of lever arms 72 disposed slidably against the inner sides of rails 32, and pivoted adjacent their forward ends to rails 32 by coaxial bolts 74, and a plate 76 extending laterally between and rigidly affixed to the rearward ends of said lever arms. The lever is normally secured in this position by a retainer bolt 78 extending through rails 32 and the rearward end portions of lever arms 72. As best shown in FIGS. 4–6, a series of laterally spaced apart holes 80 are formed in the forward edge portion of plate 76, and a similar series of holes 82 are formed in the rearward end of arm 54 affixed to collar 34. A helical tension spring 84 has its forward end hooked selectively into any one of holes 82, and its rearward end hooked selectivey into any one of holes 80. When hooked into the central holes, as in FIG. 5, said spring tends to hold coulter arm 30 yieldably in a position trailing directly rearwardly from stub axle 26, since lateral pivoting of said arm in either direction will be resisted by the extension of said spring. When said spring is hooked into others of holes 80 and 82, as in FIG. 6, it will yieldably position arm 30 at positions at either side of a vertical plane extending directly rearwardly from axle 26, the direction of offset from said plane, and the degree of offset, being determined as desired by the holes 80 and 82 selected.

When retainer bolt 78 is removed, lever 70 may be pivoted upwardly and forwardly on bolts 74, as indicated in dotted lines in FIG. 4. This relaxes spring 84, so that its ends may be easily unhooked from holes 80 and 82 and reinserted in others of said holes as desired, after which lever 70 may be pivoted rearwardly and downwardly to its original position and secured by retainer bolt 78. Also affixed to plate 76 of lever 70 is a steering handle 86 which normally projects upwardly to a position adjacent the tractor driver occupying seat 8, in order that he may guide arm 30 laterally, against the resistance of spring 84, in order to maintain blade 56 against the edge of the pavement. Said handle also serves as a rigid extension of lever 70, whereby, during adjustments of said spring as already described, said lever may be pivoted easily against the tension of the spring.

Pivoted to side rails 32 of arm 30, just rearwardly of cross bar 64, by means of transversely coaxial bolts 88, are the parallel side arms 90 of a U-shaped broom carrier 92. Said carrier extends rearwardly of blade 56, and its rearward connecting portion 94 (see FIG. 7) has affixed thereto by bolts 96 the forward connecting portion 98 of an angled U-shaped broom bracket 100, the parallel side arms 102 of which extend rearwardly at a horizontally lateral angle, as best shown in FIG. 2. Mounted rotatably between side arms 102, on a transverse axis represented by bolt 104, is a circular broom 106. Said broom rests freely on the ground surface therebeneath because of its pivotal support by bolts 88, and is turned by its contact with said ground surface as mowing machine 2 moves forwardly, providing a transverse sweeping action by reason on its horizontally angular relation to the direction of travel. As best shown in FIG. 8, the holes 108 of bracket 100 through which its mounting bolts 96 pass are slotted to engage said bolts only loosely. This permits said bracket to be adjusted so that the peripheral face of the broom may rest flush on the ground surface.

In substitution for bracket 100 and broom 106, a scraper blade 110 may be secured to pivoted carrier 92 by bolts 96, as shown in FIGS. 10 and 11. Said scraper blade is formed of sheet metal, and its lower edge 112 rests on ground surface 114 by gravity in the same manner as broom 106, said edge being horizontally sloped relative to the direction of travel to sweep cuttings of blade 56 over the ground surface toward and across line 116 of FIG. 1, which represents the line of demarcation between a grass covered ground surface and a paved surface such as a sidewalk, driveway or roadway. FIG. 1 shows the tractor operating on the paved surface, moving parallel to line 116, but it could, as will appear, function just as well when the tractor is disposed at the grass side of line 116.

In operation, the driver of the tractor elevates blade 56 above ground level by retracting hydralic ram 36. As it is raised, the head and nut of axle bolt 58 of the blade engage the side arms 90 of carrier 92 and elevate said carrier to lift broom 106 above the ground. This is a transport position, in which unrestrained side-to-side swinging of coulter arm 30 is prevented by spring 84. The operator then removes retainer bolt 78, pivots lever 70 upwardly and forwardly, as shown in dotted lines in FIG. 4, and engages the hooked ends of spring 84 in such of holes 80 and 82 that, when said lever is again pivoted to its normal position and secured by bolts 78, coulter arm 30 will tend to trail at the desired angle behind stub shaft 26, as for example as shown in FIG. 6. Ideally, for reasons which will presently appear, this angle should be such that coulter blade 56 "toes in" slightly toward the edge of the pavement. Thus, when tractor 4 is running on the pavement, as shown in FIG. 2, the blade should toe in toward the tractor, as indicated in FIG. 6. If the tractor is running on the lawn, the blade should toe outwardly from the tractor. Both of these settings are available by engaging spring 84 in the proper holes 80 and 82.

Then, using the lateral position of the blade as a guide, the operator lines the tractor up at such a lateral spacing from pavement edge 116 that blade 56 is disposed directly above said edge, then extends hydraulic ram 36 to lower coulter arm 30 to engage in the soil directly adjacent the pavement edge, and further to press coulter blade 56 into the earth until one of gauge wheels 62 engages the pavement. The gauge wheels determine the depth of penetration of the blade. One or the other of said gauge wheels will engage the pavement regardless of whether tractor 4 is operating on the pavement or on the grass. After contact is made, ram 36 functions to maintain the gauge wheel against the pavement with a constant pressure.

As the tractor is then driven forwardly, blade 56 functions, as it rotates, to cut any grass which may be extended from the turf and over the pavement, and also to cut through any soil which may have flowed out over the pavement. The operator may keep a close watch on the course of the blade, and if it should start to track away from the pavement, bring it back against the pavement by manual pressure on handle 86 in the appropriate direction. This manual control of the blade compensates for the fact that it is often difficult, if not virtually impossible, to steer the tractor so accurately as to maintain it at a precisely uniform distance from pavement edge 116, and hence eliminates any necessity for such precise steering. However, it is desirable that the blade be "toed-in" toward the pavement at all times, for two reasons. Fistly, it provides that the face of the blade distal from the pavement faces slightly forwardly, while the blade face adjacent the pavement has little or no contact with the soil. Thus the soil pressure on the distal face urges the blade constantly toward the pavement. This results in a "self-steering" action causing the blade to follow the pavement edge, often rendering use of handle 86 to steer the blade unnecessary, so long as the toe-in relation is maintained. Secondly, it provides that the leading edge of the rotating blade wipes constantly in acute angle contact with the abrasive pavement, thereby providing a "self-sharpening" operation maintaining the blade sharp.

The grass, weeds, and soil cuttings of the blade are then swept away from juncture line 116 by the trailing broom 106, or by scraper blade 110 if the latter is used in place of the broom. With the brom arranged as in FIG. 2, the cuttings are swept further onto the pavement away from the grass surface.

While we have shown and described a specific embodiment of our invention, it will be readily apparent that many minor changes of structure and operation could be made without departing from the spirit of the invention.

What we claim as new and desire to protect by Letters Patent is:

1. A lawn edging device adapted to be carried by a powered vehicle moving parallel to the lawn border to be edged, said device comprising:
   a. a coulter arm adapted to extend generally forwardly and rearwardly of said vehicle,
   b. attaching means adapted to mount the forward end of said coulter arm to said vehicle for pivotal movement on a generally vertical axis, said arm normally trailing behind said pivotal axis, said attaching means comprising a bracket adapted to be affixed to said vehicle, a stub shaft generally upright but pivoted at its lower end to said bracket on a horizontal axis which is transverse to said vehicle when said bracket is affixed to said vehicle, said coulter arm being pivoted on said stub shaft, and
   c. power means operable to pivot said stub shaft relatively to said bracket, whereby said coulter arm may be pivoted vertically upwardly or downwardly.

2. A lawn edging device as recited in claim 1 with the addition of resilient centering means operable to resist yieldably any horizontal movement of said coulter arm on its generally upright axis to either side of a vertical plane extending rearwardly from said axis, whereby to prevent unrestrained pivotal movement of said arm when said coulter blade is in its raised transport position.

3. A lawn edging device as recited in claim 2 wherein said centering means is additionally adjustable to cause said coulter arm to trail normally at adjustable angles to said vertical plane, and at either lateral side of said vertical plane.

4. A lawn edging device as recited in claim 3 wherein said centering means comprising:
   a. a rigid arm affixed to said stub axle and extending rearwardly along said coulter arm, but of lesser length than said coulter arm,
   b. a tension spring extending along said coulter arm,
   c. means securing the forward end of said spring to the rearward end of said rigid arm, selectively at different points thereof spaced apart transversely of said coulter arm, and
   d. means securing the rearward end of said spring to said coulter arm, selectively at different points spaced apart transversely of said coulter arm.

5. A lawn edging device as recited in claim 4 wherein said means securing the rearward end of said spring to said coulter arm comprises:
   a. a tightening lever pivoted to said coulter arm on a horizontal transverse axis, and normally extending rearwardly from its pivot, the rearward end of said spring being connected to the rearward end of said lever, said lever being pivoted forwardly to relax said spring and facilitate its connection both to said lever and to said rigid arm, and
   b. retainer means operable to secure said lever releasably in its rearwardly extending position.

6. A lawn edging device as recited in claim 1 with the addition of a broom carrier pivoted to said coulter arm on a horizontal transverse axis and extending rearwardly of said coulter blade, and a circular broom mounted in said carrier for rotation on a generally horizontal axis extending at an acute angle to said coulter arm, whereby said broom rests on the ground surface by gravity and is turned by its ground contact as said device moves forwardly.

7. A lawn edging device as recited in claim 6 with the addition of stop members carried by said coulter arm and operable to limit downward pivotal movement of said broom carrier relative to said coulter arm, whereby as said coulter arm is pivoted upwardly to raise said blade to its transport position, said broom is also elevated above ground level.

8. A lawn edging device as recited in claim 6 wherein said broom carrier is invertable relative to said coulter arm, whereby when inverted the axis of rotation of said broom will be oppositely angled relative to said coulter arm.

9. A lawn edging device as recited in claim 6 with the addition of a scraper blade operable to be mounted on said broom carrier interchangeably with said broom, said blade being essentially planar and inclined downwardly and rearwardly with its lower edge adapted to engage the ground surface by gravity by reason of the pivotal mounting of said carrier, the lower edge of said blade normally being disposed in a horizontal plane at an acute angle to said coulter arm.

* * * * *